A. J. GOING.
Corn Planter.

No. 77,811.

Patented May 12, 1868.

Witnesses:
H. C. AshKettle
Theo Tusche

Inventor:
A. J. Going
per Munn & Co
attorneys

United States Patent Office.

A. J. GOING, M. D., OF CLINTON, LOUISIANA.

Letters Patent No. 77,811, dated May 12, 1868.

IMPROVEMENT IN CORN-PLANTER.

*The Schedule referred to in these Letters Patent and making part of the same.*

TO ALL WHOM IT MAY CONCERN:

Be it known that I, A. J. GOING, M. D., of Clinton, in the parish of East Feliciana, and State of Louisiana, have invented a new and useful Improvement in Corn-Planters; and I do hereby declare that the following is a full, clear, and exact description thereof, which will enable those skilled in the art to make and use the same, reference being had to the accompanying drawings forming part of this specification.

This invention relates to a new and improved machine for planting corn and other seed, such as peas, rice, &c., &c., and is an improvement on that class of seeding-machines in which a rotating wheel, provided with seed-cells in its periphery, is used for a discharging-device.

The invention consists in a peculiar application of a small metallic plate, as hereinafter fully described, whereby the seed-cells of the wheel, as they rotate and pass from underneath the hopper, are cut off from the grain or seed contained in the latter, so as not to have the seed cut, bruised, or injured in the least.

In the accompanying sheet of drawings—

Figure 1:
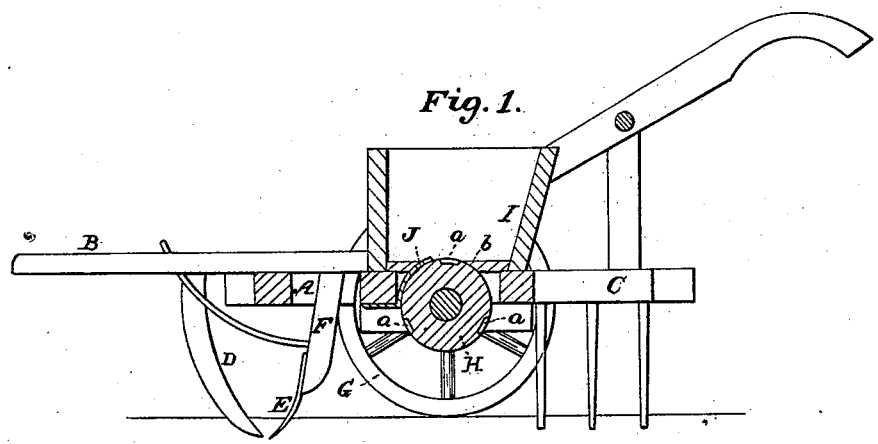
Figure 2:
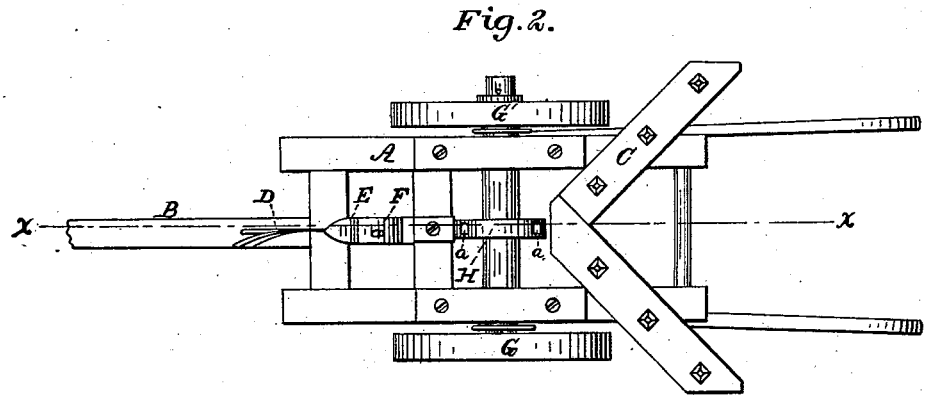

Figure 1 is a side sectional view of my invention, taken in the line $x\,x$, fig. 2.

Figure 2, an inverted plan of the same.

Similar letters of reference indicate corresponding parts.

A represents a rectangular frame, having a draught-pole, B, attached to its front end, and a beam, C, secured in its rear end, the latter being for covering the seed.

To the rear part of the draught-pole there are attached a coulter, D, and a furrow-opener, E, the latter being secured to the lower end of a standard, F, the upper end of which is framed into the draught-pole. The furrow-opener E is similar to a cultivator-tooth in form, and may be of iron or steel, and the coulter may also be of iron or steel, and curved so that its front cutting-edge will incline backward, and its point be nearly in contact with the point of the furrow-opener, as shown clearly in fig. 1. By this means the furrow-opener is prevented from becoming choked or clogged.

The frame A is mounted on two wheels, G G', the wheel G' being permanently attached to its axle, and the wheel G fitted loosely thereon. The axle therefore turns with the wheel G'.

On the axle there is permanently keyed or otherwise secured, at about its centre, a wheel, H, having seed-cells, $a$, made in its periphery, any suitable number of cells being used, as circumstances may require.

I represents a hopper, which is placed on the frame A, and has an oblong slot, $b$, made in its bottom for the upper part of the wheel H to work in, the top of the wheel being flush with the upper surface of the bottom, as shown clearly in fig. 1.

J represents a thin metal plate, which is secured in the frame A, underneath the hopper I, and passes up through the slot $b$, in contact with the front edge of the same; said plate being bent or curved to conform to the curvature of the periphery of the wheel H, as shown in fig. 1.

This plate J serves as a cut-off, effecting, as the wheel H rotates, a separation between the seed in the cells $a$ and that in the hopper I, and retains the seed in the cells until the latter reach a proper point for the discharge of the seed. Owing to the position of the plate J, the seed will not be cut, bruised, or injured, as the seed-cells pass underneath it, as the upper end of the said plate has an oblique upward position relatively with the wheel, and the seed in the hopper readily separates from that in the cells $a$. When the plate J is attached to the upper surface of the bottom of the hopper, so as to extend to the front of the slot $b$, as is generally the case, the seed is liable to be broken or crushed, as there is more of a scraping-action than a dividing or cutting-off one.

Having thus described my invention, I claim as new, and desire to secure by Letters Patent—

The arrangement of the coulter D, furrow-opener E, and standard F, with the beam B, as herein described for the purpose specified.

The above specification of my invention signed by me, this twenty-third day of November, 1867.

A. J. GOING, M. D.

Witnesses:
J. B. TAYLOR,
E. RANDLE.